Figure 1:
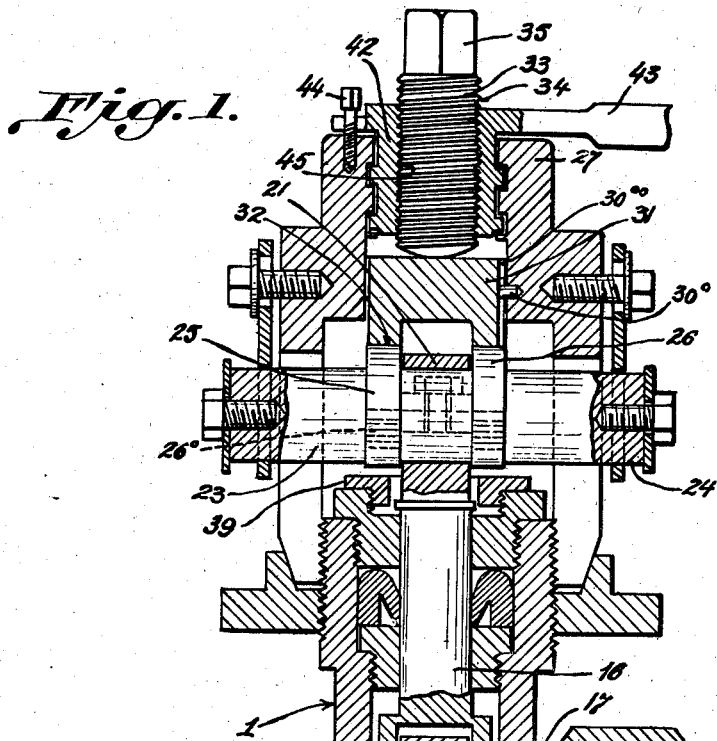

May 4, 1937.  J. HUMBLET  2,079,212

VALVE

Filed July 17, 1934

J. Humblet
INVENTOR

By Marks & Clerk
ATTYS.

Patented May 4, 1937

2,079,212

UNITED STATES PATENT OFFICE 2,079,212

VALVE

Joseph Humblet, Brussels, Belgium

Application July 17, 1934, Serial No. 735,683
In Belgium and France July 17, 1933

7 Claims. (Cl. 251—163)

The invention concerns valves, and particularly valves of the type in which the opening of the valve is quickly obtained, as for example those to be used in connection with fire extinguishers.

With fire extinguishers in which carbon dioxide is used as the extinguishing medium, it is of importance that the discharge of the carbon dioxide should be as quick and bulky as possible in order to insure rapid and rational extinction.

In a prior patent application No. 648,009 in the name of the same applicant, a quickly opened valve is described and claimed including a driving arrangement of the valve proper comprising a shaft pivoted on the valve rod and having mounted thereon one or more cam shaped members provided with a boss or bosses through which said cam shaped members cooperate with a stop or the like and thus retain the valve proper on its seat, said boss or bosses being at will moved away from or restored in contact with the stop, as for example by means of a remote control device.

The stop or the like serving as a bearing for the cam shaped members is constructed as a movable member and may be adjusted as desired, the operation of the stop enabling the opening and the closure of the valve proper to be effected without actuation of the remote control device as well as to compensate for any play which may have occurred in operation of the valve and either on the valve proper or on any member of its driving arrangement.

To this end the stop or the like was controlled through a screw mounted in a threaded opening of the valve body, the operation of the screw being effected from the outside as for example by means of an hand wheel.

Although in this arrangement the manual opening of the valve proper may be effected through a suitable operation of the screw as this latter is mainly intended to compensate for the play and wear of the valve proper and its driving arrangement a thread of a relatively small pitch is selected for the screw so that the manual opening of the valve through the actuation of the screw requires a more or less extended time, and this constitutes a drawback, particularly when the valve is mounted on extinguishers operated with liquid carbon dioxide, as in such a case it is necessary to have the valve proper fully opened in a minimum of time.

The present invention relates to an arrangement enabling also the quick and full opening of the valve proper to be obtained through hand actuation, while retaining the advantages of the prior arrangement as to the compensation of the play and wear of the valve proper and of the members of the driving arrangement thereof.

According to the invention, the adjusting device controlling the stop associated with the cam shaped members of the driving arrangement of the valve proper is provided with a threaded screw of a relatively small pitch as well as with a quickly movable member associated to or combined with the screw, the arrangement being such that the operation of the screw insures the slow displacement of the stop while the operation of the other member causes the stop to be quickly displaced.

According to a further feature of the invention, the quickly movable member is preferably shaped itself in the form of a screw, the arrangement being however such that the heaviest pressures of the extinguishing medium acting on the valve proper are unable to displace the said member.

Figure 2:
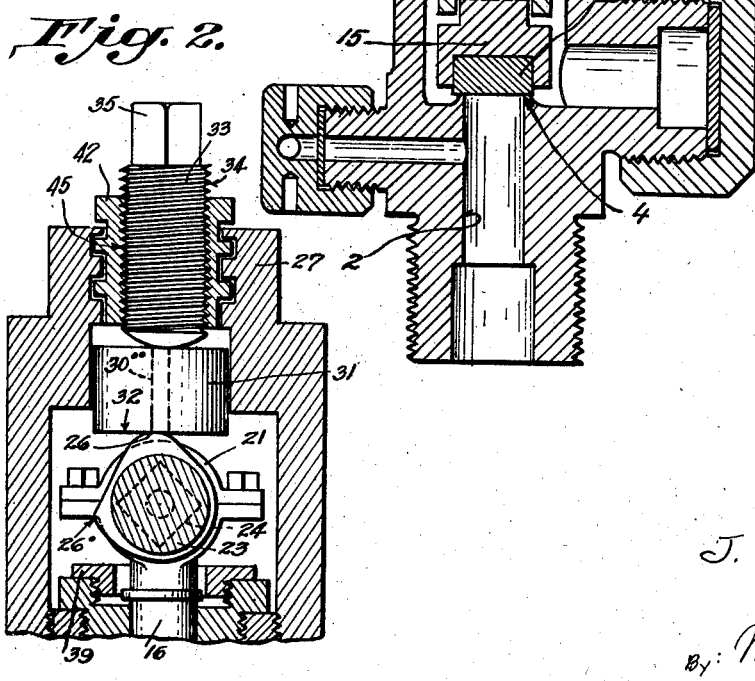

And in order that the manner in which the aforesaid arrangements are performed may be clearly understood, a preferred embodiment of the valve will now be described with more details in reference to the accompanying drawing, in which Fig. 1 is a longitudinal and axial section through the valve, and Fig. 2 is a part sectional view at right angles to Fig. 1.

In this drawing, 1 designates the valve body provided with an opening 2 accommodating the valve proper 15 provided with a packing 17 to cooperate with a seat 4 and connected to a driving rod or stem 16. Said rod is provided with a collar 21, preferably made in two parts and surrounding a shaft 23 on which two cam shaped members 25 are mounted.

These cam shaped members comprise a first boss 26 adapted to bear on surfaces 32 of a stop 31 longitudinally movable within a housing 30 provided in the body 1 or a cap 27 of the valve, the rotatory movements of the stop 31 being prevented in any suitable manner, as for example by means of the finger 30° and slit 30°° illustrated.

The cam shaped members are also provided with a second boss, as shown in dotted lines at 26° and which, upon rotation of the shaft 23, cooperate with an adjustable stop 39 screwed in the valve body 1 to mechanically move the valve proper 15 away from its seat 4.

The rotatory movement of the shaft 23 from a remote point is insured through the intermediary of square portions 24 formed at the ends of the shaft 23 and on which are secured suitable levers or similar operating members, not shown.

As far as described the valve arrangement is in accordance with the prior application in which the stop 31 is controlled through a pressure screw provided at the outside of the cap 27 with a square actuating portion.

According to the present arrangement, the cap 27 is provided with a first screw 42 of large pitch, the diameter of the screw or the number of threads thereof, or both being such that while any displacement under the pressure of the extinguishing fluid is prevented, the valve proper 15 may be quickly raised from its seat 4 by the pressure of the fluid when the screw is moved outwardly.

In the example illustrated a screw 42 formed with a quick pitch and duplicate threads is provided, the pitch being moreover such that the complete opening of the valve proper 15 is obtained for an angular displacement of 90° or less.

The screw 42 is provided with a handle or other suitable member enabling said screw to be operated, for example from a distance, and to avoid any displacement of the screw when the extinguisher is not to be operated, as for example during its transportation, a stop finger or other pin 44 is screwed into the cap 27 as illustrated.

The screw 42 is provided with a bore 45 into which is engaged a screw 33 formed with a single thread 34 and the rotatory movement of which may be obtained by means of any suitable member applied to the square portion 35.

The screw 33 bears on the stop 31 and is intended to be used to compensate for any wear which may have occurred after a series of operations of the valve, either on the valve proper or on any member of its driving arrangement.

Thus a valve is obtained which may be operated not only from a remote location through suitable actuation of the shaft 23, but also either by hand or from a distance, such for example as from another remote location, through the intermediary of the screw 42 while, at the same time, the wear or play may be compensated under every condition.

I claim:

1. A valve of the type in which the opening is quickly obtained comprising a valve proper, a valve driving rod, a movable stop, means adapted to be brought in engagement with and moved away from said stop for moving said rod and thereby applying the valve proper on its seat when moved in one direction and allowing said valve proper to move away from said seat when moved in the opposite direction, means for slowly moving the stop and means operable separately from the last named means for quickly moving said stop.

2. A valve of the type in which the opening is quickly obtained, comprising a valve proper, a valve driving rod, a movable stop, means adapted to be brought in engagement with and moved away from said stop for moving said rod and thereby applying the valve proper on its seat when moved in one direction and allowing said valve proper to move away from said seat when moved in the opposite direction, means for slowly moving said stop and means operable separately from the last named means and in the form of a larger pitch screw for quickly moving the stop.

3. A valve of the type in which the opening is quickly obtained, comprising a valve proper, a valve driving rod, a movable stop, means adapted to be brought in engagement with and moved away from said stop for moving said rod and thereby applying the valve proper on its seat when moved in one direction and allowing said valve proper to move away from said seat when moved in the opposite direction, means for slowly moving said stop, said means in the form of a small pitch screw, a large pitch screw carrying said small pitch screw for quickly moving said stop, means for operating the small pitch screw and means for operating the large pitch screw.

4. In a valve of the type in which the opening is quickly obtained, a valve proper, a valve driving rod, a movable stop for said rod, a small pitch screw for slowly moving the stop and a large pitch screw carrying said small pitch screw for quickly moving the stop, both screws being in mutual engagement.

5. A valve of the type in which the opening is quickly obtained, comprising a valve proper, a valve driving rod, a movable stop, cam shaped members associated with the valve driving rod and adapted to cooperate with the stop for operating the valve proper, a pressure member for adjusting the position of said stop and means cooperating with said pressure member for quickly allowing the stop to move away from and restoring it to any of its positions of adjustment.

6. A valve of the type in which the opening is quickly obtained, comprising a valve proper, a valve driving rod, a movable stop, and an adjustable stop, cam shaped members associated with the valve driving rod and adapted to cooperate with the stops for operating the valve proper, a pressure member for adjusting the position of the movable stop and a quick pitch screw cooperating with said pressure member for quickly allowing the movable stop to move away from and restoring it to any of its positions of adjustment.

7. A valve of the type in which the opening is quickly obtained, comprising a valve proper, a valve driving rod, a movable stop, means for operatively connecting the valve driving rod and the movable stop, means for slowly moving the stop and means carrying said last means for quickly moving said stop.

JOSEPH HUMBLET.